United States Patent
Markusch et al.

(10) Patent No.: US 6,562,932 B1
(45) Date of Patent: May 13, 2003

(54) LIGHT STABLE ONE-SHOT URETHANE-UREA ELASTOMERS

(75) Inventors: Peter H. Markusch, McMurray, PA (US); Robert L. Cline, Paden City, WV (US); Richard S. Pantone, New Martinsville, WV (US); Ralf Guether, Pittsburgh, PA (US); Thomas L. Sekelik, Carnegie, PA (US); Karl W. Haider, McKees Rocks, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/976,397

(22) Filed: Oct. 12, 2001

(51) Int. Cl.⁷ .............................................. C08G 18/10
(52) U.S. Cl. .............................. 528/58; 528/64; 528/85
(58) Field of Search .............................. 528/58, 64, 85

(56) References Cited

U.S. PATENT DOCUMENTS

| | | | |
|---|---|---|---|
| 3,755,262 A | 8/1973 | Slagel | 260/77.5 AM |
| 3,866,242 A | 2/1975 | Slagel | 2/2.5 |
| 4,153,777 A | 5/1979 | Slagel | 528/60 |
| 4,404,353 A | 9/1983 | Slagel | 528/67 |
| 4,808,690 A | 2/1989 | Slagel | 528/60 |
| 5,064,600 A | 11/1991 | Wagner et al. | 264/328.6 |
| 5,350,778 A | 9/1994 | Steppan et al. | 521/159 |
| 5,510,445 A | 4/1996 | Haider et al. | 528/60 |
| 5,646,230 A | 7/1997 | Pantone et al. | 528/64 |
| 5,668,239 A | 9/1997 | Nodelman et al. | 528/60 |
| 5,710,230 A | 1/1998 | Steppan et al. | 528/53 |
| 5,714,562 A | 2/1998 | Rosthauser et al. | 528/58 |
| 5,739,253 A | 4/1998 | Nodelman et al. | 528/60 |
| 5,811,506 A | 9/1998 | Slagel | 528/64 |
| 6,127,505 A | 10/2000 | Slagel | 528/61 |
| 6,174,948 B1 | 1/2001 | Peter | 528/64 |
| 6,204,325 B1 | 3/2001 | Maletzko et al. | 524/875 |

FOREIGN PATENT DOCUMENTS

| | | |
|---|---|---|
| DE | 2109901 | 10/1991 |
| EP | 1 197 505 | 4/2002 |

*Primary Examiner*—Rachel Gorr
(74) *Attorney, Agent, or Firm*—Joseph C. Gil; N. Denise Brown

(57) ABSTRACT

This invention relates to a process for the production of an optically clear, light-stable polyurethane-urea elastomer having an onset softening point of at least 130° C., processed at ambient temperature and casted in a mold at an isocyanate index of 95 to 120. This process comprises reacting: A) a liquid polyisocyanate or polyisocyanate prepolymer having an NCO group content of about 5 to about 50%, an average functionality of 2 to 3, a viscosity of less than 5,000 mPa.s at 25° C.; and B) an isocyanate-reactive component; in the presence of C) at least one organometallic catalyst. The present invention also relates to the optically clear, light-stable polyurethane-urea elastomers produced by this process.

29 Claims, No Drawings

LIGHT STABLE ONE-SHOT URETHANE-UREA ELASTOMERS

BACKGROUND OF THE INVENTION

The present invention relates to optically clear, light stable polyurethane-urea elastomers having an onset softening point of at least 130° C., and to a process for their production. This process comprises reacting A) a liquid polyisocyanate or a polyisocyanate prepolymer having an NCO group content of about 5 to about 50% by weight, an average functionality of 2 to 3, and a viscosity of less than 5,000 mPa.s at 25° C.; and B) an isocyanate-reactive component comprising 1) an aromatic amine group containing compound, and 2) a hydroxyl group containing cmpound; in the presence of C) an organometallic catalyst; with the components being processed at ambient temperature and casted into a mold at an isocyanate index of 95 to 120.

Various light stable cast elastomers and processes for the production of these elastomers are known and described in the art. See, for example, U.S. Pat. Nos. 3,755,262, 3,866,242, 4,153,777, 4,404,353 and 4,808,690, and German Offenlegungsschrift 2,109,901.

Transparent high-impact polyurethane products are disclosed by U.S. Pat. No. 3,755,262. These products may be elastomeric or non-elastomeric in nature. Suitable liquid polyurethane reaction mixtures for preparing these optical polyurethanes are made by the one-shot or prepolymer method. Preferred mixtures comprise a non-aromatic polyisocyanate and a reactive hydrogen containing polyol having an average of more than two hydroxyl groups per molecule and molecular weights of up to about 800. Suitable isocyanates include (cyclo)aliphatic isocyanates such as rMDI. Amine group containing compounds are not disclosed by this reference.

U.S. Pat. No. 3,866,242 discloses protective shields consisting of a polyurethane, shaped in the contour of a clipboard, windshield, face shield, etc. These polyurethanes are described as being transparent and having excellent optical clarity. Suitable polyurethanes are prepared by reacting a polyester glycol or a polyether glycol with methylenebis(cyclohexylisocyanate) to form a prepolymer, and reacting this prepolymer with methylenebis(2-chloroaniline). Suitable curing agents are broadly described as having only primary amine groups, and preferably having a methylene bridge between two aromatic rings. Mixtures of curing agents wherein both amine groups and hydroxyl groups are present are not disclosed by this patent.

U.S. Pat. No. 4,153,777 describes polyurethanes having improved physical properties. This reference specifically discloses non-porous polyurethanes which exhibit good optical clarity and resistance to weathering, ultra-violet and thermal exposure. These polyurethanes comprise an isocyanate-terminated prepolymer which is formed by first reacting the isocyanate with water, and then with a polyol to form the prepolymer. This prepolymer is then chain extended or crosslinked with a polyol to form the cured polyurethane. Suitable isocyanates include (cyclo)aliphatic isocyanates such as, for example, 4,4'-dicyclohexylmethane diisocyanate (rMDI). Suitable chain extenders and crosslinkers to be reacted with the prepolymers include compounds such as, for example, 1,4-butanediol and trimethylolpropane. Amine group containing compounds are not disclosed by this reference.

Urethane elastomers for printing belts and a process for preparing these are disclosed in U.S. Pat. No. 4,404,353. These elastomers comprise a prepolymer which is reacted with a diamine curing agent (i.e. trimethylene glycol di-p-aminobenzoate, POLACURE 740M). The prepolymers disclosed are formed by reacting an aromatic isocyanate, i.e. toluene diisocyanate (TDI), with a polyether having difunctional primary hydroxyl groups (e.g. PTMEG). Then, the prepolymer is reacted with the diamine curing agent for form the urethane elastomers. Hydroxyl group containing compounds are not described by U.S. Pat. No. 4,404,353 as being suitable for a portion of the curing agent to be reacted with the isocyanate prepolymer. The elastomers formed by this process are not light stable and require rather high temperatures (e.g >170° F.) to be cast.

High heat distortion temperature transparent polyurethanes which are highly crosslinked are described by U.S. Pat. No. 4,808,690. These comprise a prepolymer prepared from a polyisocyanate and at least one multifunctional hydroxy containing intermediate, with a polyol curing component. Suitable multifunctional hydroxyl containing intermediates include polyhydric alcohols, polyester polyols and blends thereof. Suitable polyisocyanates include (cyclo) aliphatic polyisocyanates as well as aromatic and alkyl aromatic polyisocyanates. The polyol curing component can be a polyester or a polyhydric alcohol, and typically has a low equivalent weight. Amine group containing curing components are not described by U.S. Pat. No. 4,808,690.

German Offenlegungsschrift 2,109,901 discloses a hydrolysis resistant polyurethane. This polyurethane is prepared from an aromatic isocyanate prepolymer reacted with polyols and chain extenders which include polyamines and aminoalcohols, and an alicyclic or aliphatic diisocyanate. An example of polyurethanes described by this patent is a prepolymer based on toluene diisocyanate (TDI) and polycaprolactone, which is reacted with 3,3'-dichloro4,4'-diaminodiphenylmethane (MOCA) and 4,4'-dicyclohexylmethane diisocyanate (rMDI). However, aliphatic isocyanate prepolymers are not disclosed.

RIM elastomers based on prepolymers of (cyclo)aliphatic isocyanates are described in U.S. Pat. Nos. 5,668,239, 5,710,230 and 5,739,253. U.S. Pat. No. 5,668,239 requires an isocyanate-reactive component wherein the OH:NH equivalent ratio of from 1:1 to 15:1, but expressly discloses that aromatic amines are preferably not included as part of the isocyanate-reactive component. The isocyanate prepolymers of U.S. Pat. No. 5,710,230 are reacted with an isocyanate-reactive component comprising a relatively high molecular weight component and a chain extender. Amine group containing compounds are described, but aromatic amines are disclosed as being less preferred. U.S. Pat. No. 5,739,253 requires an isocyanate-reactive blend comprising a high molecular weight polyether polyol and a low molecular weight chain extender wherein the equivalent ratio of hydroxyl groups to amine groups is from 1:2 to 20:1. This patent also discloses that aromatic amine group containing compounds are less preferred. Because these products are processed by an injection reaction molding (RIM), the reaction mixture is injected in a closed mold.

Other light stable elastomers are disclosed in, for example, U.S. Pat. Nos. 5,510,445, 5,646,230, 5,714,562 and 6,174,984. These elastomers may be polyurethanes as in U.S. Pat. Nos. 5,714,562 and 6,174,984; polyurethane/ureas in as U.S. Pat. No. 5,646,230 or polyureas as in U.S. Pat. No. 5,510,445.

Isocyanate-terminated prepolymers and a process of preparing polyurethane/urea elastomer from these prepolymers are described by U.S. Pat. No. 5,646,230. These prepolymers have an NCO content of 3 to 10% and comprise the reaction product of a) an aromatic diisocyanate, b) a polyether polyol having an OH number of 25 to 125 and from 1.8 to 2.5 OH groups, and c) an aliphatic diisocyanate. The polyurethane/urea elastomers are prepared by reacting the isocyanate-terminated prepolymers with a sterically hindered aromatic amine group containing compound such as, for example, DETDA or ETHACURE 300. Hydroxyl group containing compounds are not described as possibly chain extenders for the isocyanate-terminated prepolymers. The reaction products do not exhibit light stability.

The light stable elastomers of U.S. Pat. No. 5,714,562 are described as having good dynamic properties. These elastomers comprise the reaction product of a) an isocyanate prepolymer having an NCO group cotnent of about 3 to 15%, b) a chain extender containing two hydroxyl groups and having a MW of 62 to 400, and c) a catalyst selected from a specific group of catalysts. Suitable isocyanate prepolymers comprise the reaction product of 1) 4,4'-dicyclohexylmethane diisocyanate containing at least 90% by weight of the trans,trans-isomer, and 2) a polyether containing 2 to 4 hydroxyl groups and having a MW of 400 to 8,000. Amine group containing chain extenders and/or crosslinkers are not disclosed.

U.S. Pat. No. 6,174,984 discloses clear resilient polyurethane elastomers. These elastomers comprise the reaction product of A) a prepolymer of at least one diisocyanate and at least one polyether polyol, having a free diisocyanate content of less than 1% of the prepolymer, B) at least one alkylated aromatic diamine in a quantity sufficient to react with about 50 to 105% of the available isocyanate content in the prepolymer, and C) at least one organic acid catalyst in a quantity sufficient to reduce the pot life to no more than two minutes. These elastomers possess high resilience and clarity.

A process for producing compact, transparent polyisocyanate polyaddition products is disclosed in U.S. Pat. No. 6,204,325. The process comprises reacting (a) (cyclo) aliphatic diisocyanates with (b) isocyanate-reactive compounds, optionally in the presence of (c) catalysts and (d) auxiliaries and/or additives. The isocyanate-reactive compounds (b) are described as a mixture of compounds having a functionality of >3 and an average hydroxyl number of from 300 to 950 mg KOH/g. Amine group containing chain extenders and/or crosslinkers are not disclosed. The required reaction temperature in the mold is disclosed as >40° C., preferably 60 to 100° C.

Polyurea elastomers prepared by a one-step process are described in U.S. Pat. No. 5,510,445. The process comprises reacting (a) one or more (cyclo)aliphatic diisocyanates, (b) one or more liquid amine-terminated polymers containing at least two aromatically bound isocyanate-reactive primary or secondary amine groups and/or aliphatically bound isocyanate-reactive secondary amino groups and having a molecular weight of from 400 to 6,000, and (c) one or more aromatic diamine chain extenders having a molecular weight of from 108 to 399, optionally in admixture with one or more crosslinkers. Suitable diisocyanates include 4,4-dicyclohexylmethane diisocyanate (rMDI) and prepolymers thereof. DETDA is disclosed as a suitable aromatic diamine chain extender.

One example of U.S. Pat. No. 5,510,445 illustrates that useful elastomers can not be prepared from (cyclo)aliphatic diisocyanates when the isocyanate-reactive component comprises DETDA and a polyol. By comparison, the inventors of the present application found that this problem is overcome by the presence of an organometallic catalyst (preferably an organotin catalyst). The present invention results in optically clear, light stable polyurethane/urea elastomers by reacting a (cyclo)aliphatic diisocyanate or a prepolymer thereof, with an isocyanate-reactive component comprising an organic compound containing at least two aromatic amine groups and an organic compound containing at least two hydroxyl groups, in the presence of a catalyst comprising an organometallic compound. The elastomers of the present invention have excellent physical properties and high temperature dimensional stability.

SUMMARY OF THE INVENTION

This invention relates to a process for the production of an optically clear, light-stable polyurethane-urea elastomer having an onset softening point of at least 130° C., processed at ambient temperature and casted in a mold at an isocyanate index of 95 to 120. This process comprises reacting: A) a liquid polyisocyanate or polyisocyanate prepolymer having an NCO group content of about 5 to about 50%, an average functionality of 2 to 3, a viscosity of less than 5,000 mPa.s at 25° C., and comprising: (1) from 20 to 100% by weight, based on 100% by weight of A), of a (cyclo)aliphatic polyisocyanate having an NCO group content of about 32% to about 50% by weight and a functionality of about 2, and (2) from 0 to 80% by weight, based on 100% by weight of A), of at least one organic compound having at least two hydroxyl groups, and a molecular weight of from about 62 to about 8,000; with B) an isocyanate-reactive component comprising (1) at least one organic compound containing at least two aromatic amine groups, and having a molecular weight of 100 to 1,000 and (2) at least one organic compound having at least two hydroxyl groups and a molecular weight of about 62 to 6,000; in the presence of C) at least one organometallic catalyst.

The present invention also relates to optically clear, light-stable polyurethane-urea elastomers having an onset softening point of at least 130° C. These elastomers comprise the reaction product of: A) a liquid polyisocyanate or polyisocyanate prepolymer having an NCO group content of about 5 to about 50%, an average functionality of 2 to 3, a viscosity of less than 5,000 mPa.s at 25° C., and comprising: (1) from 20 to 100% by weight, based on 100% by weight of A), of a (cyclo)aliphatic polyisocyanate having an NCO group content of about 32% to about 50% by weight and a functionality of about 2, and (2) from 0 to 80% by weight, based on 100% by weight of A), of at least one organic compound having at least two hydroxyl groups, and a molecular weight of from about 62 to about 8,000; with B) an isocyanate-reactive component comprising (1) at least one organic compound containing at least two aromatic amine groups, and having a molecular weight of 100 to 1,000 and (2) at least one organic compound having at least two hydroxyl groups and a molecular weight of about 62 to 6,000; in the presence of C) at least one organometallic catalyst.

DETAILED DESCRIPTION OF THE INVENTION

The liquid polyisocyanate or polyisocyanate prepolymer, component A), has an NCO group content of about 5 to 50%, an average functionality of about 2 to 3 and a viscosity of less than about 5,000 mPa.s at 25° C. Preferably, component A) has an NCO group content of about 10 to 32%, most preferably 15 to 32% by weight and a functionality of about 2. Component A) comprises: A)(1) from 20 to 100% by weight, based on 100% by weight of A), of a (cyclo)aliphatic polyisocyanate, and A)(2) from 0 to 80% by weight, based on 100% by weight of A), of at least one organic compound having at least two hydroxyl groups and a molecular weight of from about 62 to 8000.

Component A) preferably comprises the reaction product of A)(1) a (cyclo)aliphatic polyisocyanate comprising 4,4'-dicyclohexylmethane diisocyanate, with A)(2) at least one organic compound having at least two hydroxyl groups and a molecular weight of from about 62 to 8000. In this preferred embodiment, the prepolymer preferably comprises the reaction product of A)(1) from about 40 to 80% by weight, based on 100% by weight of A), of 4,4'-dicyclohexylmethane diisocyanate, with A)(2) from about 20 to 60% by weight, based on 100% by weight of A), of at least one organic compound having at least two hydroxyl groups (preferably 2 to 3 hydroxyl groups) and a molecular weight of from about 62 to 8000 (preferably 300 to 2,000). It is particularly preferred in this embodiment that A)(2) comprise polytetramethylene ether glycols and polycaprolactones.

Component A) comprises from 20 to 100%, preferably 40 to 80%, and more preferably 60 to 80% by weight of A)(1) the (cyclo)aliphatic polyisocyanate component, based on 100% by weight of component A). Suitable (cyclo)aliphatic polyisocyanates for component A)(1) include those having an NCO group content of about 32% to about 50% by weight and a functionality of about 2. Suitable (cyclo)aliphatic polyisocyanates are selected from the group consisting of 4,4'-dicyclohexylmethane diisocyanate (rMDI), 1,6-hexamethylene diisocyanate (HDI), isophorone diisocyanate (IPDI), 1,4-cyclohexane diisocyanate (CHDI), m-tetramethylxylene diisocyanate (m-TMXDI), and mixtures thereof. The preferred polyisocyanate for component A)(1) is 4,4'-dicyclohexylmethane diisocyanate, which has an isocyanate group content of about 32% and is commercially available from Bayer Corporation.

Component A)(2), the organic compound, has at least two hydroxyl groups and a molecular weight of from about 62 to 8000. Component A) comprises 0 to 80%, preferably 20 to 60%, and more preferably 20 to 40% by weight of component A)(2), based on 100% by weight of component A). Suitable organic compounds to be used as component A)(2) in accordance with the present invention include those organic compounds having at least 2 hydroxyl groups, preferably 2 to 3 hydroxyl groups and most preferably 2 hydroxyl groups; preferably a molecular weight of 62 to 4,000 and most preferably 300 to 2,000. Examples of suitable compounds to be used component A)(2) include glycols, polyethers, polythioethers, polyesters, polycaprolactones, polycarbonates and polyacetals.

Examples of glycols and other suitable components for A)(2) include compounds known to be suitable as low molecular weight chain extenders as well as low molecular weight diols. Some examples include those compounds with molecular weight of about 350 or less such as, for example, an alkylene ($C_2$-$_{22}$) glycol, e. g., ethylene glycol, propylene glycol, 1,4-butylene glycol, 1,3-butylene glycol, 1,2-butylene glycol, 1,6-hexanediol, 2-methyl- 1,3-propanediol, 2,2,4-trimethylpentane-1,3-diol, neopentyl glycol, 1,10-dodecanediol; poly(alkylene($C_2$-$_{15}$) glycol), e.g., diethylene glycol, triethylene glycol, tetraethylene glycol, dipropylene glycol, tripropylene glycol; other glycols such as cyclohexane dimethanol, hydrogenated bisphenol A, 1,4-dihydroxy-2-butene, 2,6-dimethyl-1-octene-3,8-diol, hydroquinone bis (2-hydroxy-ethyl)ether, resorcinol bis(2-hydroxyethyl)ether, bishydroxyethylene terephthalate; low molecular weight triols with molecular weight of 350 of less such as glycerin, 2-methyl-2-hydroxymethyl-1,3-propanediol, 2,4-dihydroxy-3-hydroxymethylpentane, 1,2,6-hexanetriol, 1,1,1-tris(hydroxymethyl)propane, 2,2-bis(hydroxymethyl)-3-butanol and other aliphatic triols ($C_8$-$_{20}$), etc., as well as mixtures thereof, and the like. It is also possible that mixtures of the above mentioned compounds with small amounts of mono-functional and/or higher-functional compounds can be used as component A)(2) provided that the above functionality and molecular weight requirements are satisfied.

Suitable polyester polyols may, for example, be prepared from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of possible dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. These dicarboxylic acids may be used individually or else in a mixture with one another. Instead of the free dicarboxylic acids, it is also possible to use the corresponding dicarboxylic acid derivatives, such as esters of dicarboxylic acids with alcohols having from 1 to 4 carbon atoms, or anhydrides of dicarboxylic acids. Examples of di- and polyhydric alcohols are: ethanediol, diethylene glycol, 1,2- and 1,3-propanediol, dipropylene glycol, 1,4-butanediol, 1,5-pentanediol, 1,6-hexanediol, 1,10-decanediol, 1,12-dodecanediol, glycerol and trimethylolpropane. It is also possible to use polyester polyols made from lactones, e. g. ϵ-caprolactone or hydroxycarboxylic acids, e.g. omega-hydroxycaproic acid. Preferred polyester polyols for the present invention include those polyesters which do not have a tendency to crystallize.

To prepare the polyester polyols, the organic, e.g. aromatic and preferably aliphatic, polycarboxylic acids and/or derivatives of these and polyhydric alcohols may be polycondensed without a catalyst or preferably in the presence of esterification catalysts, usefully in an atmosphere of inert gas, e.g. nitrogen, carbon monoxide, helium, argon, etc., in the melt at from 150 to 250° C., preferably from 180 to 220° C., if desired under reduced pressure, as far as the desired acid number, which is advantageously less than 10, preferably less than 2. In a preferred embodiment, the esterification mixture is polycondensed to an acid number of from 80 to 30, preferably from 40 to 30, under atmospheric pressure and then under a pressure of less than 500 mbar, preferably from 50 to 150 mbar. Examples of possible esterification catalysts are catalysts using iron, cadmium, cobalt, lead, zinc, antimony, magnesium, titanium or tin, in the form of metals, metal oxides or metal salts. However, the polycondensation may also be carried out in a liquid phase in the presence of diluents and/or carriers, such as benzene, toluene, xylene or chlorobenzene for azeotropic removal of the water of condensation by distillation.

Also, suitable compounds to be used as component A)(2) include polycarbonate polyols obtained by a ring-opening polymerization of ethylene carbonate using the low molecular weight diols and low molecular weight triols as an initiator; and natural polyols such as castor oil; polyolefin polyols such as polybutadiene polyol and polyisoprene polyol and hydrated products thereof. These may be used alone or as mixtures of two or more of them.

Other suitable polyols for component A)(2) include polycarbonate diols, which may be obtained by reacting diphenyl or dimethyl carbonate with low molecular weight diols or triols, ε-caprolactone-modified diols or triols of the type mentioned above.

Suitable polyesters, polythioethers, polyacetals, polycarbonates and other polyhydroxyl compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl HanserVerlag, Munich, 1966, pages 45–71.

The polyethers suitable for use in accordance with the present invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Suitable initiator compounds which can be alkoxylated to form component A)(2) in the present invention include, for example, the low molecular weight chain extenders, ethylene glycol, propylene glycol, diethylene glycol, dipropylene glycol, butyl carbitol, butanediol, pentanediol, bisphenol A, neopentyl glycol, trimethyl pentanediol, cyclohexane dimethanol, etc. Mixtures of suitable initiator compounds can also be used provided that the functionality of the resultant polyol mixture is at least about 2.0.

Suitable polyethers include, for example, those compounds based on di-functional starters such as, for example, water, ethylene glycol, propylene glycol, etc. These compounds include copolymers of ethylene oxide and propylene oxide.

Component A) can be a liquid monomeric (cyclo) aliphatic diisocyanate or a liquid polyisocyanate prepolymer. The liquid polyisocyanate prepolymer component A) can be formed, for example, by reacting the diisocyanate A)(1) and organic compound A)(2) having at least 2 hydroxyl groups under a nitrogen blanket or sparge, optionally, in the presence of a catalyst, and heating to about 105° C. for between 4 and 12 hours. The reaction is monitored by % NCO titration. Other suitable processes for the preparation of prepolymers, which are known, can also be used.

Component B), the isocyanate-reactive component, comprises B)(1) at least one organic compound containing at least two aromatic amine groups, and B)(2) at least one organic compound having at least two hydroxyl groups.

Component B) comprises from 3% to 90%, preferably 5 to 60%, and more preferably 10 to 40% by weight of component B)(1), based on 100% by weight of component B). Component B)(1) comprises at least one organic compound containing at least two aromatic amine groups, and having a molecular weight of about 100 to 1,000. A preferred embodiment of the organic compound containing at least two aromatic amine groups has a molecular weight of about 100 to about 400. It is more preferred that from two to three aromatic amine groups be present in the organic compound B)(1). Most preferred as component B)(1) are those organic compounds having an aromatic amine functionality of about 2 and a molecular weight of about 150 to about 250. The aromatic diamines can contain ether groups and/or ester groups but are preferably free of such groups. Amine-terminated polyethers with the amine-terminating groups as aromatic amine groups are also suitable for use as component B)(1).

Suitable examples of organic compounds containing at least two aromatic amine groups to be used as component B)(1) include aromatic diamine chain extenders having a molecular weight of from 100 to 1,000. The preferred amine chain extenders contain exclusively aromatically bound primary or secondary (preferably primary) amino groups, and preferably also contain alkyl substituents. Examples of such diamines include 1,4-diaminobenzene; 2,4- and/or 2,6-diaminotoluene; 2,4'- and/or 4,4'-diaminodiphenylmethane; 3,3'-dimethyl-4,4'-diaminodiphenylmethane; 3,3'-dichloro-4,4'-diaminodiphenyl methane (MOCA); 1-methyl-3,5-bis (methylthio)-2,4- and/or-2,6-diaminobenzene; 1,3,5-triethyl-2,4-diaminobenzene; 1,3,5-triisopropyl-2,4-diaminobenzene; 1-methyl-3,5-diethyl-2,4- and/or-2,6-diaminobenzene (also known as 3,5-diethyl-2,4- and/or-2,6-toluenediamine, or DETDA); 4,6-dimethyl-2-ethyl-1,3-diaminobenzene; 3,5,3',5'-tetraethyl4,4'-diaminodiphenylmethane; 3,5,3',5'-tetraisopropyl-4,4'-diaminodiphenylmethane; 3,5-diethyl-3',5'-diisopropyl-4,4'-diaminodiphenylmethane; 2,4,6-triethyl-m-phenylenediamine (TEMPDA); 3,5-diisopropyl-2,4-diaminotoluene; 3,5-di-sec-butyl-2,6-diaminotoluene; 3-ethyl-5-isopropyl-2,4-diaminotoluene; 4,6-diisopropyl-m-phenylenediamine; 4,6-di-tert-butyl-m-phenylenediamine; 4,6-diethyl-m-phenylenediamine; 3-isopropyl-2,6-diaminotoluene; 5-isopropyl-2,4-diaminotoluene; 4-isopropyl-6-methyl-m-phenylenediamine; 4-isopropyl-6-tert-butyl-m-phenylenediamine; 4-ethyl-6-isopropyl-m-phenylenediamine; 4-methyl-6-tert-butyl-m-phenylenediamine; 4,6-di-sec-butyl-m-phenylenediamine; 4-ethyl-6-tertbutyl-m-phenylenediamine; 4-ethyl-6-sec-butyl-m-phenylenediamine; 4-ethyl-6-isobutyl-m-phenylenediamine; 4-isopropyl-6-isobutyl-m-phenylenediamine; 4-isopropyl-6-sec-butyl-m-phenylenediamine; 4-tert-butyl-6-isobutyl-m-phenylenediamine; 4-cyclopentyl-6-ethyl-m-phenylenediamine; 4-cyclohexyl-6-isopropyl-m-phenylenediamine; 4,6-dicyclopentyl-m-phenylenediamine; 2,2',6,6'-tetraethyl-4,4'-methylenebisaniline; 2,2',6,6'-tetraisopropyl-4,4'-methylenebisaniline (methylenebis diisopropylaniline); 2,2',6,6'-tetra-sec-butyl-4,4'-methylenebisaniline; 2,2'-dimethyl-6,6'-di-tert-butyl-4,4'-methylenebisaniline; 2,2'-di-tert-butyl-4,4'-methylenebisaniline; and 2-isopropyl-2',6'-diethyl-4,4'-methylenebisaniline. Such diamines may, of course, also be used as mixtures.

It is particularly preferred that component B)(1), the organic compound containing at least two aromatic amine groups, comprise a compound selected from the group consisting of an isomer of diethyltoluenediamine, a mixture of isomers of diethyltoluenediamine, an isomer of dimethylthiotoluenediamine, and a mixture of isomers of dimethylthiotoluenediamine.

The isocyanate reactive component B) additionally comprises component B)(2) one or more organic compounds having at least two hydroxyl groups. Component B) comprises from 10% to 97%, preferably 40 to 95%, and more preferably 60 to 90% by weight, based on 100% by weight of component B), of at least one organic compound having at least two hydroxyl groups and a molecular weight of about 62 to 6,000. More preferably, the organic compound contains two or three hydroxyl groups and has a molecular weight of 62 to 4,000. It is most preferred that B)(2) has an hydroxyl functionality of two and a molecular weight of 90 to 4,000. The organic compound having at least two hydroxyl groups can contain a glycol or a polyol or a mixture thereof. Examples of component B)(2) include compounds having at least two hydroxyl groups including polyethers, polythioethers, polyesters, polycaprolactones, glycols, polycarbonates and polyacetals.

Examples of glycols and other suitable components for B)(2) include compounds known to be suitable as low molecular weight chain extenders as well as low molecular weight diols. Some examples include those compounds with molecular weight of about 350 or less such as, for example, an alkylene ($C_2$-$_{22}$) glycol, e. g., ethylene glycol, propylene glycol, 1,4-butylene glycol, 1,3-butylene glycol, 1,2-butylene glycol, 1,6-hexanediol, 2-methyl-1,3-propanediol, 2,2,4-trimethylpentane-1,3-diol, neopentyl glycol, 1,10-dodecanediol; poly(alkylene($C_2$-$_{15}$) glycol), e.g., diethylene glycol, triethylene glycol, tetraethylene glycol, dipropylene glycol, tripropylene glycol; other glycols such as cyclohexane dimethanol, hydrogenated bisphenol A, 1,4-dihydroxy-2-butene, 2,6-dimethyl-1-octene-3,8-diol, hydroquinone bis(2-hydroxy-ethyl)ether, resorcinol bis(2-hydroxyethyl)ether, bishydroxyethylene terephthalate; low molecular weight triols with molecular weight of 350 of less such as glycerin, 2-methyl-2-hydroxymethyl-1,3-propanediol, 2,4-dihydroxy-3-hydroxymethylpentane, 1,2,6-hexanetriol, 1,1,1-tris(hydroxymethyl)propane, 2,2-bis(hydroxymethyl)-3-butanol and other aliphatic triols ($C_8$-$_{20}$), etc., as well as mixtures thereof, and the like. It is also possible that mixtures of the above mentioned compounds with small amounts of mono-functional and/or higher-functional compounds can be used as component B)(2) provided that the above functionality and molecular weight requirements are satisfied.

Suitable polyester polyols may, for example, be prepared from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of possible dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. These dicarboxylic acids may be used individually or else in a mixture with one another. Instead of the free dicarboxylic acids, it is also possible to use the corresponding dicarboxylic acid derivatives, such as esters of dicarboxylic acids with alcohols having from 1 to 4 carbon atoms, or anhydrides of dicarboxylic acids. Examples of di- and polyhydric alcohols are: ethanediol, diethylene glycol, 1,2- and 1,3-propanediol, dipropylene glycol, 1,4-butanediol, 1,5-pentanediol, 1,6-hexanediol, 1,10-decanediol, 1,12-dodecanediol, glycerol and trimethylolpropane. It is also possible to use polyester polyols made from lactones, e. g. $\epsilon$-caprolactone or hydroxycarboxylic acids, e.g. omega-hydroxycaproic acid.

To prepare the polyester polyols, the organic, e.g. aromatic and preferably aliphatic, polycarboxylic acids and/or derivatives of these and polyhydric alcohols may be polycondensed without a catalyst or preferably in the presence of esterification catalysts, usefully in an atmosphere of inert gas, e.g. nitrogen, carbon monoxide, helium, argon, etc., in the melt at from 150 to 250° C., preferably from 180 to 220° C., if desired under reduced pressure, as far as the desired acid number, which is advantageously less than 10, preferably less than 2. In a preferred embodiment, the esterification mixture is polycondensed to an acid number of from 80 to 30, preferably from 40 to 30, under atmospheric pressure and then under a pressure of less than 500 mbar, preferably from 50 to 150 mbar. Examples of possible esterification catalysts are catalysts using iron, cadmium, cobalt, lead, zinc, antimony, magnesium, titanium or tin, in the form of metals, metal oxides or metal salts. However, the polycondensation may also be carried out in a liquid phase in the presence of diluents and/or carriers, such as benzene, toluene, xylene or chlorobenzene for azeotropic removal of the water of condensation by distillation.

Also suitable as component B)(2), compounds having at least two hydroxyl groups, are polycarbonate polyols obtained by a ring-opening polymerization of ethylene carbonate using the low molecular weight diols and low molecular weight triols as an initiator; and natural polyols such as castor oil; polyolefin polyols such as polybutadiene polyol and polyisoprene polyol and hydrated products thereof. These may be used alone or as mixtures of two or more of them.

Other suitable polyols for component B)(2) include polycarbonate diols, which may be obtained by reacting diphenyl or dimethyl carbonate with low molecular weight diols or triols, $\epsilon$-caprolactone-modified diols or triols of the type mentioned above.

Suitable polyesters, polythioethers, polyacetals, polycarbonates and other polyhydroxyl compounds which may be used in accordance with the invention may be found, for example, in High Polymers, Volume XVI, "Polyurethanes, Chemistry and Technology," by Saunders-Frisch, lnterscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl HanserVerlag, Munich, 1966, pages 45–71.

The polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Suitable initiator compounds which can be alkoxylated to form component B)(2) in the present invention include, for example, the low molecular weight chain extenders, ethylene glycol, propylene glycol, diethylene glycol, dipropylene glycol, butyl carbitol, butanediol, pentanediol, bisphenol A, neopentyl glycol, trimethyl pentanediol, cyclohexane dimethanol, etc. Mixtures of suitable initiator compounds can also be used provided that the functionality of the resultant polyol mixture is at least about 2.0.

Suitable polyethers include, for example, those compounds based on di-functional starters such as, for example, water, ethylene glycol, propylene glycol, etc. These compounds include copolymers of ethylene oxide and propylene oxide.

Suitable catalysts (C) include organic metal compounds, especially organic tin and bismuth compounds. Suitable organic tin compounds include those containing sulfur, such as dioctyl tin mercaptide (German Auslegeschrift 1,769,367 and U.S. Pat. No. 3,645,927), and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutytin maleate, and dioctyltin diacetate. Suitable bismuth compounds include bismuth neodecanoate, bismuth versalate, and various bismuth carboxylates known in the art. The preferred organometallic catalyst comprises a tin(IV) catalyst comprising dibutyltin dilaurate, dimethyltin dilaurate, or mixtures thereof.

Any of the above-mentioned catalysts may, of course, be used as mixtures. Further representatives of catalysts to be used according to the invention and details concerning their mode of action are described in Kunststoff Handbuch, Volume VII, published by Vieweg and Huchtlen, Carl Hanser Verlag, Munich, 1966, for example, on pages 96 to 102.

The organometallic catalyst can be used in a quantity ranging from about 0.002 to about 5%, preferably from about 0.01 to about 1% by weight, based on the total quantity of components (A), (B), and (C).

In addition, various additives may also be present in the reaction, for example, surface-active additives such as emulsifiers, and other additives known to be useful in polyurethane chemistry.

In addition to the surface-active agents, other additives which may be used in the molding compositions of the present invention include flame retarding agents, plasticizers, antioxidants, UV stabilizers, adhesion promoters, dyes, viscosity depressants, and internal mold release agents. Suitable antioxidants include, for example, Irganox 245, and suitable UV stabilizers include, for example, Tinuvin 765. However, any of the known antioxidants and/or UV stabilizers may be used. If a stabilizer selected from the group consisting of antioxidants, UV-stabilizers, hindered amine light stabilizers, and mixtures thereof is present, it is preferably added to the polyisocyanate or the polyisocyanate prepolymer.

In the one-stage (or "one-shot") method, the isocyanate reactive component and the catalyst, as well as any additives and auxiliaries are typically combined and thoroughly blended in a premix. The liquid polyisocyanate or polyisocyanate prepolymer A) is then mixed with the premix in a container by agitation or in the mixhead of a molding machine. External release agents, such as silicone oils, are often used during the molding process. It is, however, also possible to use so-called "internal release agents", optionally in admixture with external release agents. The reactants are used in quantities such that the isocyanate index is from about 90 to 125. By "isocyanate index" is meant the quotient of the number of isocyanate groups divided by the number of isocyanate-reactive groups, multiplied by 100.

The polyurethane-urea elastomers of the invention are preferably prepared by casting into a suitable mold. The temperature at which the polyurethane-urea elastomers of the invention are prepared is generally not critical and the mold temperature can be at ambient temperatures. Ambient temperature is defined for the purposes of the present invention as temperature from about 15 to about 30° C. The processing temperatures are usually less than 40° C. The gel time for the one-shot process of the present invention is preferably greater than 2 minutes. The polyurethane-urea elastomers of the present invention have a shore hardness that can vary over a very wide range, i.e., Shore A 40–Shore D 95, depending on the choice of polyol, isocyanate, and amine/glycol extender. Polyurethane-urea elastomers of high hardness, i.e., greater than Shore D 50, are preferably postcured at temperatures above 100° C. for about. 16 hours.

The optically clear, light-stable polyurethane-urea elastomers prepared according to the invention have an onset softening point of at least 130° C. These elastomers exhibit very good dimensional stability at elevated temperature and result in products that will not show "creep" even in soft elastomers.

The method used to determine onset softening point is thermal mechanical analysis (TMA) according to ASTM 1545-95A. As used herein, the term "onset softening point" of a TMA experiment is defined as the temperature at which tangent lines drawn from temperatures before the transition (constant derivative value) and at the deflection point of the transition (maximum at the derivative curve) meet. This is a very useful measurement for determining the transition temperatures, especially for polymeric materials which are polydisperse in nature.

As used herein, the term "optically clear" means a light transmittance similar or superior to other polymer glasses, i.e., acrylics or polycarbonate. The light transmittance of the polyurethane-urea elastomers of the present invention is close to optical grade glass used for lenses, binoculars, etc. The luminous transmittance of the polyurethane-urea elastomers of the present invention is greater than 85%, preferably 90%. The haze of the polyurethane-urea elastomers of the present invention is usually less than 1%. Haze and luminous transmittance as used herein are determined according to ASTM D 1003-97.

The optically clear, light-stable polyurethane-urea elastomer products obtainable by the novel process may be used as a glass substitute, for example as sun roofs, front windows, back windows or side windows in automotive or aircraft construction and/or as lamp covers, for example as front lamps or rear lamps in aircraft or automotive construction. The polyurethane-urea elastomers prepared according to the invention may preferably be used, for example, in optical applications such as lenses for eyeglasses, safety glasses, and security glass.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following components were used in the working examples:

| | |
|---|---|
| Isocyanate A: | 4,4'-dicyclohexylmethane diisocyanate having an isocyanate group content of about 32%. |
| Isocyanate B: | 1,6-hexamethylene diisocyanate having an isocyanate group content of about 50%. |
| Isocyanate C: | isophorone diisocyanate having an isocyanate group content of about 37.8%. |
| Isocyanate D: | an isocyanate prepolymer having an NCO group content of about 23%, a functionality of 2.0, and a viscosity of about 400 mPa.s at 25° C. and comprising the reaction product of about 75.5% by weight of Isocyanate A, 24.5% by weight Polyol B and 0.002% by weight Catalyst A. |
| Isocyanate E: | an isocyanate prepolymer having an NCO group content of about 23%, a functionality of 2.0, and a viscosity of about 310 mPa.s at 25° C. and comprising the reaction product of about 75.5% by weight of Isocyanate A, 24.5% by weight Polyol C and 0.002% by weight Catalyst A. |
| Isocyanate F: | an isocyanate prepolymer having an NCO group content of about 22.9%, a functionality of 2.0, and a viscosity of about 150 mPa.s at 25° C. and comprising the reaction product of about 76.4% by weight of Isocyanate A, 23.6% by weight Polyol D and 0.002% by weight Catalyst A. |

-continued

| | |
|---|---|
| Isocyanate G: | an isocyanate prepolymer having an NCO group content of 23%, a functionality of 2.0, and a viscosity of about 150 mPa · s at 25° C., and comprising the reaction product of about 75.5% by weight Isocyanate A, 24.5% by weight Polyol E and 0.002% by weight Catalyst A. |
| Isocyanate H: | an isocyanate prepolymer having an NCO group content of 23%, a functionality of 2.0, and a viscosity of about 150 mPa · s at 25° C., and comprising the reaction product of about 75.5% by weight Isocyanate A, 24.5% by weight Polyol F and 0.002% by weight Catalyst A. |
| Isocyanate I: | an isocyanate prepolymer having an NCO group content of 22.8%, a functionality of 2.0, and a viscosity of about 500 mPa · s at 25° C., and comprising the reaction product of about 65% by weight Isocyanate C, 35% by weight Polyol B and 0.002% by weight Catalyst A. |
| Isocyanate J: | an isocyanate prepolymer having an NCO group content of 22.7%, a functionality of 2.0, and a viscosity of about 350 mPa · s at 25° C., and comprising the reaction product of about 50.5% by weight Isocyanate B, 49.5% by weight Polyol B and 0.002% by weight Catalyst A. |
| Isocyanate K: | an isocyanate prepolymer having an NCO group content of about 18.3%, a functionality of 2.0, and a viscosity of about 800 mPa.s at 25° C. and comprising the reaction product of about 66.7% by weight of Isocyanate A, 33.3% by weight of Polyol A and 0.002% by weight Catalyst A. |
| Isocyanate L: | an isocyanate prepolymer having an NCO group content of 13.9%, a functionality of 2.0, and a viscosity of about 3640 mPa · s at 25° C., and comprising the reaction product of about 50.5% by weight Isocyanate A, 49.5% by weight Polyol B and 0.002% by weight Catalyst A. |
| Isocyanate M: | an isocyanate prepolymer having an NCO group content of 6.0%, a functionality of 2.2, and a viscosity of about 3520 mPa · s at 25° C., and comprising the reaction product of about 24.24% by weight Isocyanate A, 53.03% by weight Polyol G, 22.73% by weight of Polyol H and 0.002% by weight Catalyst A. |
| Polyol A: | polytetramethylene ether glycol, a difunctional polyol having an equivalent weight of about 500 and commercially available as Polymeg 1000 from DuPont Company, QO Chemicals Inc., and BASF Corporation. |
| Polyol B: | polytetramethylene ether glycol, a difunctional polyol having an equivalent weight of about 1000 and commercially available as Polymeg 2000 from DuPont Company, QO Chemicals Inc., and BASF Corporation. |
| Polyol C: | a difunctional polycaprolactone based polyester polyol having an equivalent weight of about 1000 and commercially available as Tone 1241 from Union Carbide Corporation. |
| Polyol D: | a poly (oxyalkylene) polyol having an equivalent weight of about 730 and a functionality of about 2, and prepared by adding a mixture of about 80% propylene oxide and 20% ethylene oxide to propylene glycol such that about 90% of the hydroxyl group are primary. |
| Polyol E: | an ultra-low monol polyether polyol based on propylene oxide and having an equivalent weight of about 1000, a functionality of about 2, with all the hydroxyl groups being secondary. |
| Polyol F: | a polyoxyalkylene polyol having a equivalent weight of about 1000, an OH number of about 56, and a functionality of about 2, and prepared by adding propylene oxide to propylene glycol such that about all of the hydroxyl groups are secondary. |
| Polyol G: | a polyoxyalkylene polyol having a equivalent weight of about 2000, an OH number of about 28, and a functionality of about 2, and prepared by adding a mixture of 87% propylene oxide and 13% ethylene oxide into propylene glycol such that about 75% of the hydroxyl groups are primary. |
| Polyol H: | a polyoxyalkylene polyol having a equivalent weight of about 2000, a functionality of about 3, and prepared by adding a mixture of 87% propylene oxide and 13% ethylene oxide to glycerine such that about 85% of the hydroxyl groups are primary. |
| Diol Extender A: | 1,4-butanediol |
| Amine A: | a diethyltoluenediamine having an equivalent weight of 89, a functionality of about 2, and comprising about 80% by weight of the 2,4-isomer and about 20% by weight of the 2,6-isomer; commercially available as Ethacure 100LC Curative from the Albemarle Corporation. |
| Amine B: | a dimethylthiotoluenediamine having an equivalent weight of 107, a functionality of about 2, and comprising about 80% by weight of the 2,4-isomer and about 20% by weight of the 2,6-isomer; commercially available as Ethacure 300 Curative from the Albemarle Corporation. |
| Catalyst A: | dimethyl tin dilaurate commercially available from Witco Chemical Corporation as Formez ® UL-28. |
| Catalyst B: | 33% triethylenediamine in dipropylene glycol commercially available from Air Products as DABCO 33 LV. |

Casting Procedure

The polyols and isocyanates were degassed at 50–60° C., then cooled to room temperature before casting. The castings were made by mixing the polyols and the isocyanates at 25–30° C. for about 1–2 minutes, then cast into room temperature book-case molds (measuring 8"×16"×0.125") and button molds (measuring 7.5"×2.25"×0.5"). (One button mold was used for each sample.) The samples were left in the molds at room temperature for about 16 hours before demolding. After 1 month at room temperature, the samples were submitted for physical testing.

In all of the examples, the catalyst (UL-28) level was adjusted to make the reaction rate of the polyol and or glycol similar to that of the diamine. In all Examples except I, Ia, II, X and XV, the Hauschild SpeedMixer DAC40OFV available from FlackTek Inc. was used for mixing (1000–1600 RPM for 1540 sec).

TABLE 1

| | Example | | | | | | | |
|---|---|---|---|---|---|---|---|---|
| | I | Ia | II | IIa | III | IIIa | IV | IVa |
| Isocyanate D (g) | 90.8 | 90.8 | 74.35 | 74.35 | | | | |
| Isocyanate E (g) | | | | | 69.89 | 69.89 | 50.62 | 50.62 |
| % NCO | 23.03 | 23.03 | 23.03 | 23.03 | 22.99 | 22.99 | 22.99 | 22.99 |
| Amine A (g) | 27.2 | | 14.08 | | 24.75 | | 13.01 | |
| Diol Extender A (g) | | 13.73 | | 7.11 | | 12.49 | | 6.57 |

TABLE 1-continued

| | Example | | | | | | | |
|---|---|---|---|---|---|---|---|---|
| | I | Ia | II | IIa | III | IIIa | IV | IVa |
| Polyol C (g) | | | | | 85.7 | 85.7 | 116.8 | 116.77 |
| Polyol A (g) | 82.44 | 82.44 | 112.54 | 112.54 | | | | |
| Catalyst A (g) | 0.81 | 0.81 | 0.11 | 0.11 | 0.059 | 0.059 | 0.081 | 0.081 |
| % NCO rxn w/amine-chain extd | 8 | | 4 | | 8 | | 4 | |
| % NCO rxn w/diol - extd | | 8 | | 4 | | 8 | | 4 |
| Tensile Strength | 5926 | 3156 | 3549 | 1618 | 5900 | 3030 | 5078 | 2975 |
| 100% Mod. | 2548 | 1275 | 857 | 534 | 2048 | 1019 | 720 | 399 |
| Elongation | 340 | 426 | 399 | 400 | 349 | 446 | 462 | 520 |
| Die C Tear | 779 | 517 | 417 | 329 | 1229 | 549 | 498 | 386 |
| Hardness (Shore A) | | 94/90 | 92/90 | 80/79 | | 92/91 | 90/89 | 78/78 |
| Hardness (Shore D) | 58/55 | | | | 63/60 | | | |
| Onset Softening Pt. (° C.) | 160 | 112 | 150 | 96 | 195 | 113 | 178 | 107 |
| $T_g$ ° C. | −66 | −73 | −57 | −56 | −61 | −61 | −64 | −58 |

In Table 1, Examples Ia, IIa, IIIa, and IVa are comparison examples, and Examples I, II, III and IV are representative of the present invention and the resulting elastomers have a softening point of at least 130° C. The examples according to the invention also show significant improved physical properties (i.e., much higher tensile and tear strength). In the comparative examples the amine component of the present invention is substituted for a diol.

TABLE 2

| | Example | | | | | |
|---|---|---|---|---|---|---|
| | V | Va | VI | VIa | VII | VIII |
| Isocyanate F (g) | 75.14 | 75.14 | 57.6 | 57.6 | | |
| Isocyanate G (g) | | | | | 51.98 | |
| Isocyanate H (g) | | | | | | 50.89 |
| Isocyanate I (g) | | | | | | |
| % NCO | 22.93 | 22.93 | 22.93 | 22.93 | 23 | 22.95 |
| Amine A (g) | 24.66 | | 12.87 | | 13 | 13.03 |
| Diol Extender A (g) | | 12.45 | | 6.5 | | |
| Polyol D (g) | 80.95 | 80.95 | 110.45 | 110.45 | | |
| Polyol E (g) | | | | | 116.46 | |
| Polyol F (g) | | | | | | 116.6 |
| Catalyst A (g) | 0.16 | 0.16 | 0.22 | 0.22 | 1.16 | 1.16 |
| % NCO rxn w/amine-chain extd | 8 | | 4 | | 4 | 4 |
| % NCO rxn w/diol - extd | | 8 | | 4 | | |
| Tensile Strength | 2523 | 890 | 941 | 298 | 1266 | 1013 |
| 100% Mod. | 1578 | 877 | 502 | 272 | 467 | 405 |
| Elongation | 331 | 134 | 415 | 152 | 585 | 603 |
| Die C Tear | 579 | 253 | 306 | 101 | 291 | 317 |
| Hardness (Shore A) | 98/98 | 90/89 | 84/82 | 70/67 | 85/82 | 83/81 |
| Hardness (Shore D) | 55/51 | | | | | |
| Onset Softening Pt. (° C.) | 160 | 104 | 148 | 86 | 147 | 141 |
| $T_g$ ° C. | −53 | −58 | −58 | −56 | −61 | −62 |

In Table 2, Examples Va and VIa are comparison examples, and Examples V, VI, VII and VIII are representative of the present invention and the resulting elastomers have a softening point of at least 130° C. In the comparative examples, the amine component of the present invention is substituted with a diol, which results in substantially lower softening points. The examples according to the invention also show significant improved physical properties (i.e., much higher tensile and tear strength).

TABLE 3

| | Example | | | | | |
|---|---|---|---|---|---|---|
| | IX | IXa | X | XI | XIa | XII |
| Isocyanate I (g) | 135.98 | 135.98 | 66.94 | | | |
| Isocyanate J (g) | | | | 183.2 | 144.8 | 111.33 |
| % NCO | 22.82 | 22.82 | 22.82 | 22.67 | 22.67 | 22.67 |
| Amine A (g) | 40.71 | | 12.67 | 54.47 | | 21.07 |
| Diol Extender A (g) | | 20.55 | | | 21.75 | |
| Polyol A (g) | 122.63 | 122.63 | 100.88 | 163.19 | 129.06 | 166.98 |
| Catalyst A (g) | 0.31 | 0.57 | 0.1 | 0.41 | 0.38 | 0.25 |
| % NCO rxn w/amine-chain extd | 8 | | 4 | 8 | | 4 |
| % NCO rxn w/diol - extd | | 8 | | | 8 | |
| Tensile Strength | 6360 | 2079 | 3745 | 4206 | 2878 | 1767 |
| 100% Mod. | 1781 | 330 | 778 | 1391 | 1298 | 820 |
| Elongation | 377 | 414 | 340 | 329 | 774 | 302 |
| Die C Tear | 685 | 201 | 424 | 620 | 674 | 395 |
| Hardness (Shore A) | | 67/67 | 88/87 | 96/96 | 97/97 | 88/87 |
| Hardness (Shore D) | 55/54 | | | | | |
| Onset Softening Pt. (° C.) | 172 | 129 | 155 | 209 | 124 | 181 |
| $T_g$ (° C.) | −62 | −62 | −67 | −87 | −85 | −67 |

In Table 3, Examples IXa and XIa are comparison examples. Examples IX, X, XI and XII are representative of the present invention and the resulting elastomers have a softening point of at least 130° C. In the comparative examples, the amine component of the present invention is substituted with a diol. The examples according to the invention also show significant improved physical properties (i.e., much higher tensile and tear strength).

TABLE 4

| Example | XIII | XIIIa | XIV | XV | XVI |
|---|---|---|---|---|---|
| Isocyanate A (g) | 63.3 | 63.3 | 50.3 | | |
| Isocyanate D (g) | | | | 58.07 | |
| Isocyanate K (g) | | | | | 165.35 |
| % NCO | 32 | 32 | 32 | 23.03 | 18.25 |
| Amine A (g) | 24.43 | | 12.26 | 6.03 | 20.58 |
| Diol Extender A (g) | | 12.33 | | | 11.13 |
| Polyol A (g) | 92 | 92 | 113 | 116.42 | 102.27 |
| Catalyst A (g) | 0.095 | 0.095 | 0.11 | 0.116 | 0.113 |
| % NCO rxn w/ amine-chain extd | 8 | | 4 | 2 | 4 |
| % NCO rxn w/ diol-extd | | 8 | | | 4 |
| Tensile Strength | 6024 | 3089 | 4221 | 1568 | 6598 |
| 100% Mod. | 2726 | 1469 | 951 | 355 | 1963 |
| Elongation | 218 | 370 | 325 | 417 | 323 |
| Die C Tear | 770 | 509 | 412 | 253 | 537 |
| Hardness (Shore A) | | | | 72/71 | 97/96 |
| Hardness (Shore D) | 60/59 | 41/39 | 37/36 | | 50/49 |
| Onset Softening Pt. (° C.) | 176 | 106 | 139 | 129 | 181 |
| $T_g$ ° C. | −49 | −38 | −50 | −21 | −83 |

In Table 4, Examples XIIIa and XV are comparison examples. In Example XIIIa, the amine component of the present invention is substituted with a diol component. Example XV is a comparative example as it contains less than the required minimum amount of 3% of an amine extender. In both cases, the onset softening poing drops below 130° C. If the amount of amine chain extender is increase to 4% (as in Example II) using otherwise the same chemical composition, the onset softening point is increased to 150° C.

In Table 4, Examples XIII, XIV and XVI are representative of the present invention. The resultant elastomers formed in these examples have softening points of at least 130° C.

TABLE 5

| Example | XVII | XVIIa | XVIII | XVIIIa | XIX |
|---|---|---|---|---|---|
| Isocyanate L (g) | 184.73 | 184.6 | | | |
| Isocyanate M (g) | | | 150.07 | 150.72 | |
| Isocyanate D (g) | | | | | 128.35 |
| % NCO | 13.91 | 13.91 | 6.06 | 6.06 | 23.18 |
| Amine A (g) | 39.9 | | 12.08 | | |
| Amine B (g) | | | | | 46.14 |
| Diol Extender A (g) | | 20.14 | 3.15 | 9.3 | |
| Polyol A (g) | 65.8 | 65.8 | | | 115.98 |
| Catalyst A (g) | 0.066 | 0.066 | 0.003 | 0.009 | 0.116 |
| % NCO rxn w/amine-chain extd | 8 | | 4 | | 8 |
| % NCO rxn w/diol-extd | | 8 | 2 | 6 | |
| Tensile Strength | 5642 | 2371 | 2383 | 919 | 5999 |
| 100% Mod. | 2356 | 1567 | 721 | 705 | 999 |
| Elongation | 369 | 405 | 697 | 251 | 288 |
| Die C Tear | 731 | 465 | 402 | 190 | 466 |
| Hardness (Shore A) | | | | 85/85 | |
| Hardness (Shore D) | 59/56 | 46/45 | 34/32 | 24/23 | 49/47 |
| Onset Softening Pt. (° C.) | 183 | 107 | 180 | 106 | 166 |
| $T_g$ ° C. | −28 | −46 | −74 | −76 | * |

*Heat cure at 50° C. for 5 days, very slow to cure

In Table 5, Examples XVIIa and XVIIIa are comparison examples. Examples XVII, XVIII and XIX are representative of the present invention and the resulting elastomers have a softening point of at least 130° C. Example XIX used a different amine as the chain extender, which resulted in an elastomer that cured very slowly. Thus, the mold containing this elastomer was placed in the oven for curing. In the comparison examples, the amine component of the present invention was substituted with a diol. In all Examples according to the present invention, the physical properties of the elastomers were far superior over the comparative examples and all products exhibited optical clarity.

TABLE 6

| Example | XX | XXI | XXII |
|---|---|---|---|
| Isocyanate D (g) | 45.08 | 45.08 | 45.08 |
| % NCO | 23 | 23 | 23 |

TABLE 6-continued

| Example | XX | XXI | XXII |
|---|---|---|---|
| Amine A (g) | 13.63 | 13.63 | 13.63 |
| Polyol A (g) | 41.29 | 41.29 | 41.29 |
| Catalyst B (g) | 0.084 | 0.44 | 0 |
| % NCO rxn w/ amine-chain extd | 8 | 8 | 8 |

Examples XX, XXI and XXII are comparison examples. The resulting elastomers of these three (3) examples were white in color, i.e., not optically clear, and too poor in quality to test their physical properties. All three (3) samples broke very easily. Examples XX, XXI and XXII illustrate that the use of amine catalysts or no catalyst yield poor quality polyurethane-urea elastomers. This demonstrates that an organometallic catalyst is required according to the present invention to produce optically clear products with excellent physical properties as shown in Example I which has otherwise the same chemical compostion.

Alternative Casting Procedure

Examples XXIII, XXIV and XXV were casted according to the following procedure. The materials were processed on a gear driven, low-pressure polyurethane processing machine from Edge-Sweets (Model 15BT). The machine was equipped with two-gallon raw material containers and had the ability to degas as well as heat the materials to the desired temperatures. Mixing was achieved through a high-shear mixer.

The polyols and isocyanates were degassed in the raw material containers at 25° C. The polyol pump was set to 985 RPM and the recirculation pressure adjusted to 80 psi. The isocyanate pump was set to 1051 RPM and also 80 psi recirculation pressure. After calibration, the materials were dispensed through the mixhead into a container and then poured into room temperature book-case molds (measuring 8"×16"×0.125") and button molds (measuring 7.5"×2.25"×0.5"). The samples were then postcured at 100° C. for about 16 hours before demolding. After two weeks at ambient temperature, the samples were submitted for physical testing. The catalyst level was adjusted to make the reaction rate of the polyol and/or glycol similar to that of the diamine.

TABLE 7

| Example | XXIII | XXIV | XXV |
|---|---|---|---|
| Isocyanate K (g) | 110.38 | 118.51 | 129.07 |
| % NCO | 18.3 | 18.3 | 18.3 |
| Amine A (g) | 29.3 | 16.34 | |
| Diol Extender A (g) | | 8 | 17.3 |
| Polyol A (g) | 70.67 | 76.65 | 82.7 |
| Catalyst A (g) | 0.054 | 0.054 | 0.054 |
| % NCO rxn w/ amine-chain extd | 8 | 4 | |
| % NCO rxn w/ glycol-extd | | 4 | 8 |
| Tensile Strength | 7265 | 6193 | 3865 |
| 100% Mod. | 3236 | 1351 | 886 |
| Elongation | 272 | 371 | 358 |
| Die C Tear | 741 | 552 | 399 |
| Hardness (Shore A) | | 95 | 83 |
| Hardness (Shore D) | 59 | 43 | 30 |
| Onset Softening Pt. (° C.) | 197 | 142 | 128 |
| $T_g$ ° C. | * | −25 | −29 |

* Not determined

Example XXV is a comparison example where the diamine chain extender is substituted by a diol. Even when the diamine chain extender is reduced from 8% to 4% of available NCO, the softening point is still higher than 130° C. as illustrated by Examine XXIV. Also, the physical properties such as tensile strength and tear strength are considerably higher in the examples according to the present invention (i.e. Examples XXIII and XXIV).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an optically clear, light-stable polyurethane-urea elastomer having an onset softening point of at least 130° C., comprising reacting:
    A) a liquid polyisocyanate or polyisocyanate prepolymer having an NCO group content of about 5 to about 50%, an average functionality of 2 to 3, a viscosity of less than 5,000 mPa.s at 25° C., and comprising the reaction product of:
        (1) from 20 to 100% by weight, based on 100% by weight of A), of a (cyclo)aliphatic polyisocyanate having an NCO group content of about 32% to about 50% by weight and a functionality of about 2, wherein said (cyclo)aliphatic polyisocyanate is selected from the group consisting of 4,4'-dicyclohexylmethane diisocyanate (rMDI), 1,6-hexamethylene diisocyanate (HDI), isophorone diisocyanate (IPDI), 1,4-cyclohexane diisocyanate (CHDI), m-tetramethylxylene diisocyanate (m-TMXDI), and mixtures thereof; and
        (2) from 0 to 80% by weight, based on 100% by weight of A), of at least one organic compound having at least two hydroxyl groups, and a molecular weight of from about 62 to about 8,000; and
    B) an isocyanate-reactive component comprising:
        1) from 3% to 90% by weight, based on 100% by weight of component B), of at least one organic compound containing at least two aromatic amine groups, and having a molecular weight of 100 to 1,000; and
        2) from 10% to 97% by weight, based on 100% by weight of component B), of at least one organic compound having at least two hydroxyl groups and a molecular weight of about 62 to 6,000;
    in the presence of
    C) at least one organometallic catalyst;
    wherein the components are casted in a mold at an isocyanate index of 95 to 120.

2. The process of claim 1, wherein the components are processed at a temperature of about 40° C. or less.

3. The process of claim 2, wherein the components are processed at ambient temperature.

4. The process of claim 1, wherein A) said liquid polyisocyanate or polyisocyanate prepolymer has an NCO group content of about 10 to 50% by weight, and a functionality of about 2.

5. The process of claim 1, wherein A) said liquid polyisocyanate or polyisocyanate prepolymer has an NCO group content of about 15 to 30% by weight and a functionality of about 2.

6. The process of claim 4, wherein said liquid polyisocyanate or polyisocyanate prepolymer comprises the reaction product of A)(1) a (cyclo)aliphatic polyisocyanate comprising 4,4'-dicyclohexylmethane diisocyanate, with A)(2) at least one organic compound having at least two hydroxyl groups and a molecular weight of from about 62 to about 8,000.

7. The process of claim 1, wherein A)(2) said organic compound has a molecular weight of about 100 to about 4,000.

8. The process of claim 7, wherein A)(2) said organic compound has a functionality of about 2 and a molecular weight of about 300 to about 2,000.

9. The process of claim 1, wherein B)(1) said organic compound containing at least two aromatic amine groups has a molecular weight of about 100 to about 400.

10. The process of claim 1, wherein B)(1) said organic compound containing aromatic amine groups has a functionality of about 2 and a molecular weight of about 150 to about 250.

11. The process of claim 1, wherein B)(1) said aromatic diamines are free of ether groups and/or ester groups.

12. The process of claim 1, wherein B)(1) said organic compound containing aromatic amine groups comprises an amine-terminated polyether wherein the amine-terminating groups are aromatic amine groups.

13. The process of claim 1, wherein B)(1) is selected from the group consisting of an isomer of diethyltoluenediamine, a mixture of isomers of diethyltoluenediamine, an isomer of dimethylthiotoluenediamine, and a mixture of isomers of dimethylthiotoluenediamine.

14. The process of claim 1, wherein B)(2) said organic compound having at least two hydroxyl groups has a molecular weight of 62 to 4,000.

15. The process of claim 1, wherein B)(2) said organic compound having at least two hydroxyl groups has a functionality of about 3 or less.

16. The process of claim 1, wherein B)(2) said organic compound having at least two hydroxyl groups comprises a low molecular weight glycol.

17. The process of claim 16, wherein said low molecular weight glycol has a molecular weight less than 500.

18. The process of claim 17, wherein said low molecular weight glycol has a molecular weight of less than 300.

19. The process of claim 1, wherein B)(2) said organic compound having at least two hydroxyl groups comprises a high molecular weight polyol.

20. The process of claim 19, wherein said high molecular weight polyol has a molecular weight greater than 500.

21. The process of claim 20, wherein said high molecular weight polyol has a molecular weight greater than 800.

22. The process of claim 21, wherein said high molecular weight polyol has a molecular weight greater than 1000.

23. The process of claim 1, wherein B)(2) said organic compound having at least two hydroxyl groups comprises a mixture of a glycol and a polyol.

24. The process of claim 1, wherein C) said organometallic catalyst comprises a tin catalyst.

25. The process of claim 24, wherein said tin catalyst comprises an organic tin(IV) catalyst.

26. The process of claim 24, wherein said organic tin catalyst is selected from the group consisting of dibutyltin dilaurate, dimethyltin dilaurate and mixtures thereof.

27. The process of claim 1, wherein said elastomer is post cured after demolding for at least 8 hours at a temperature of at least about 100° C.

28. The process of claim 1, wherein said component A) a liquid polyisocyanate or polyisocyanate prepolymer has an NCO group content of at least 5% and wherein said component A) a (cyclo)aliphatic polyisocyanate prepolymer has a monomer diisocyanate content of at least 10%.

29. The process of claim 1, wherein said polyisocyanate or polyisocyanate prepolymer has a viscosity of less than 1,000 mPa.s at 25° C.

* * * * *